Feb. 22, 1949.     G. GIVONI     2,462,632
APPLIANCE FOR STRETCHING GLOVES OR THE LIKE
Filed May 2, 1946     2 Sheets-Sheet 1
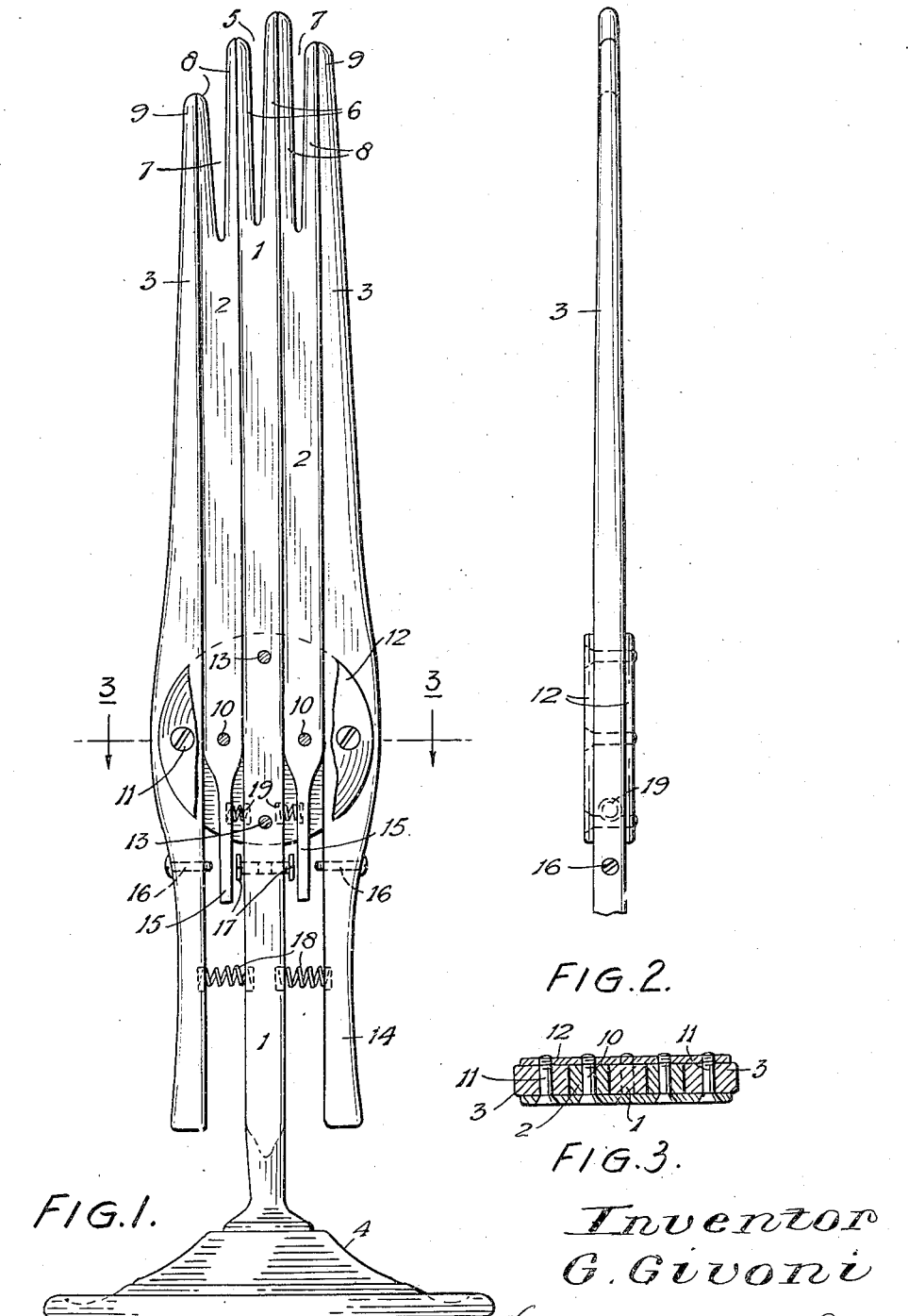

Feb. 22, 1949. G. GIVONI 2,462,632
APPLIANCE FOR STRETCHING GLOVES OR THE LIKE
Filed May 2, 1946 2 Sheets-Sheet 2

Inventor
G. Givoni

Patented Feb. 22, 1949

2,462,632

UNITED STATES PATENT OFFICE 2,462,632

APPLIANCE FOR STRETCHING GLOVES OR THE LIKE

Gideon Givoni, Melbourne, Victoria, Australia

Application May 2, 1946, Serial No. 666,657
In Australia May 24, 1945

9 Claims. (Cl. 223—80)

1

This invention relates to an improved appliance for stretching gloves or the like, and is intended mainly for use in the factory during the manufacture of gloves, although it can also be used in glove shops and the like.

In the manufacture of gloves, it is the practice during the finishing treatment to stretch the fingers of the gloves prior to pressing. This stretching has hitherto been performed by means of a tong-like hand appliance which is inserted into and expanded in each finger of the glove separately. This operation is slow and tedious.

The present invention provides an improved type of appliance by means of which all of the fingers of the glove can be stretched in one action, thus considerably reducing the time and labor required in the operation.

The improved appliance is characterized by having four finger members of divided or two-part construction to receive the four fingers of the glove simultaneously and means whereby said finger members can be all expanded in the one operation.

In the preferred construction, the appliance has a central member which is slotted at its upper end to form two half-sections of the finger members, and four movable members arranged two on each side of the central member. The movable members adjacent to the central member are also slotted at the upper end to form two half-sections of the finger members, while the two outer movable members are each shaped at their upper ends to form one half-section of a finger member.

The movable sections are pivotally mounted and operated by handles to separate the co-acting half-sections of the finger members and thereby expand and stretch the fingers of the glove.

The invention is more fully described aided by reference to the accompanying drawings wherein:

Fig. 1 is a front view, partly in section, of the improved appliance.

Fig. 2 is a side view of portion of Fig. 1.

Fig. 3 is a cross-section taken substantially on the line 3—3 of Fig. 1.

Figures 4, 5:
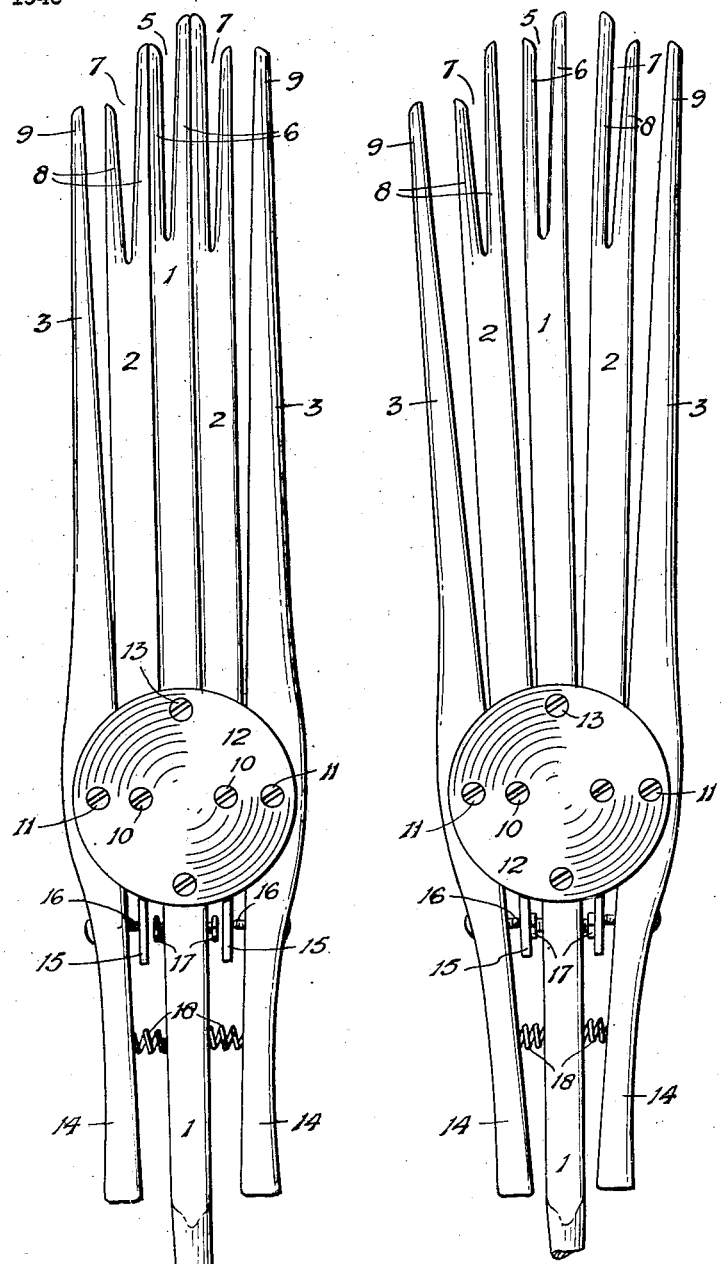
Figs. 4 and 5 are front views illustrating the action of the appliance.

As is shown in these views, the appliance comprises a central fixed member 1 and two pairs of movable members 2 and 3 respectively arranged with one member of each pair on each side of the fixed member 1. The fixed member may be supported by a suitable base member as 4 of substantial weight to give the appliance stability in use.

2

The upper end of the fixed member 1 is slotted as at 5 and shaped to from two half-fingers 6. The movable member 2 on each side of the central fixed member 1 is also slotted as at 7 at its upper end and shaped to form the two half-fingers 8, while the two outer members 3 are shaped at their upper ends to form single half-fingers 9 without being slotted.

The shaped half-fingers 6, 8 and 9 lie together and co-act to form four finger members as shown in Fig. 1.

The movable members 2 and 3 are pivoted by means of screws 10 and 11 to plates 12 secured as by means of screws 13 to the central member 1.

The two outer members 3 have handles 14 at their lower ends for operating purposes. The two inner members 2 have short lower ends 15 which are reduced in thickness to permit free pivotal movement.

The handles 14 of the outer members 3 carry contact screws 16 adapted to engage the short ends 15 of the movable members 2. Likewise, the central fixed member 1 has abutments 17 which act to limit the inward movement of the short ends 15 of the members 2.

Coiled compression springs 18 are fitted between the handles 14 and the central fixed member 1 to automatically return the members 3 to normal position after each use. Similar coiled springs as 19 may also be arranged between the short ends 15 of the members 2 and the central member 1 for the same purpose.

In using the appliance, the glove to be stretched is drawn onto the four finger members of the appliance while said members are closed as shown in Fig. 1. The handles 14 are then actuated to pivotally move the members 3 on their pivots 11 to cause the half-fingers 9 to separate from the members 2 as shown in Fig. 4. This causes the two outer fingers of the glove to be stretched first as is preferred in the stretching of gloves.

Continued pressure on the handles 14 brings the contact screws 16 into contact with the short ends 15 of the members 2 and causes said members to move pivotally on their pivots 10 and separate the half-fingers 8 from those of the central fixed member 1 as shown in Fig. 3. This action stretches the two middle fingers of the glove.

The four finger members of the appliance are thus all expanded in one action and the four fingers of the glove are thus stretched in one operation in contradistinction to the previous method wherein each finger is stretched individually.

Upon release of the handles 14, the movable members 2 and 3 are returned to the initial positions by the action of the springs 18 and, if provided, the springs 19 and the half-fingers 6, 8 and 9 close together so that the glove can be readily removed.

The appliance will be found very effective in use and will greatly reduce the time and labor required in the stretching of gloves. It is also simple in construction and easy to actuate.

What I claim is:

1. An appliance for stretching gloves or the like comprising a central fixed member and four movable members arranged two on each side of the fixed member, the fixed and movable members being shaped at their upper ends to form half-fingers which, when the movable members are closed, co-act in pairs to form four finger members of two part construction, and means for actuating the movable members to cause the half-fingers of the respective finger members to open or separate.

2. An appliance for stretching gloves or the like comprising a central member slotted at its upper end to form two half-fingers and four movable members arranged two on each side of the central member, the movable members adjacent to the central member on each side being also slotted at their upper ends to form two half-fingers and the outer movable members being each shaped to form one half-finger, the movable members when closed coating in pairs to form with the central member four finger members with two part construction, and means for actuating the movable members to cause the half fingers of the respective finger members to open or separate.

3. An appliance for stretching gloves or the like comprising a central fixed member slotted at its upper end to form two half-fingers, a movable member on each side of said central member also slotted at its upper end to form two half-fingers, an outer movable member on each side adjacent to the aforesaid movable members and having a single half-finger at its upper end, and means for actuating said movable members to separate them from the central member and from each other to thus separate the co-acting half-fingers.

4. An appliance for stretching gloves or the like as claimed in claim 3 wherein the four movable members are pivoted to plates secured to the central fixed member.

5. An appliance for stretching gloves or the like as claimed in claim 3 wherein the movable members are pivoted and the outer members are extended at their lower ends to form operating handles.

6. An appliance for stretching gloves or the like as claimed in claim 3 wherein the outer movable members have projections to engage the ends of the other movable members and actuate same.

7. An appliance for stretching gloves or the like as claimed in claim 3 wherein the central fixed member is supported by a base member of substantial weight to give the appliance stability in use.

8. An appliance for stretching gloves or the like comprising a central fixed member having its upper end slotted to form two half-fingers, pivot plates carried by said central member, four movable members pivoted to said plates and arranged two on each side of the central member, each outer movable member having its upper end shaped to form a single half-finger while the inner movable members have their upper ends shaped to form two half-fingers, the half-fingers of all five members co-acting to form four divided finger members, spring means maintaining the members closed, handles extending from the lower ends of the outer movable members and means on said handles for engaging the lower ends of the inner movable members to pivotally operate said inner members when the outer members are actuated by the handle.

9. An appliance for stretching gloves or the like as claimed in claim 8 wherein the means on the handles for actuating the inner movable members are such that the outer movable members are opened or separated in advance of the inner movable members.

GIDEON GIVONI.

REFERENCES CITED

The following references are of record in the file of this patent:

UNITED STATES PATENTS

| Number | Name | Date |
|---|---|---|
| 1,173,955 | Grueber | Feb. 22, 1916 |

FOREIGN PATENTS

| Number | Country | Date |
|---|---|---|
| 236,618 | Germany | Aug. 5, 1910 |